April 7, 1959     E. T. YOUNG     2,880,908
APPARATUS FOR DISPENSING AND PRICING SELECTED
BLENDS OF TWO LIQUIDS
Filed July 16, 1957     9 Sheets-Sheet 1

INVENTOR.
EINAR T. YOUNG
BY
ATTORNEYS

INVENTOR.
EINAR T. YOUNG

INVENTOR.
EINAR T. YOUNG

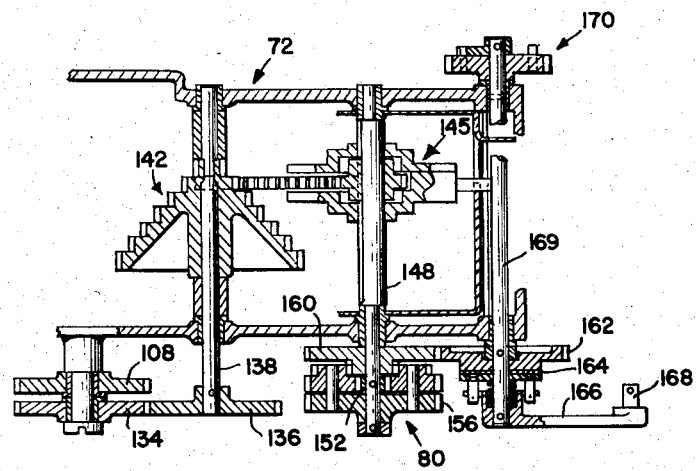
FIG. 4.
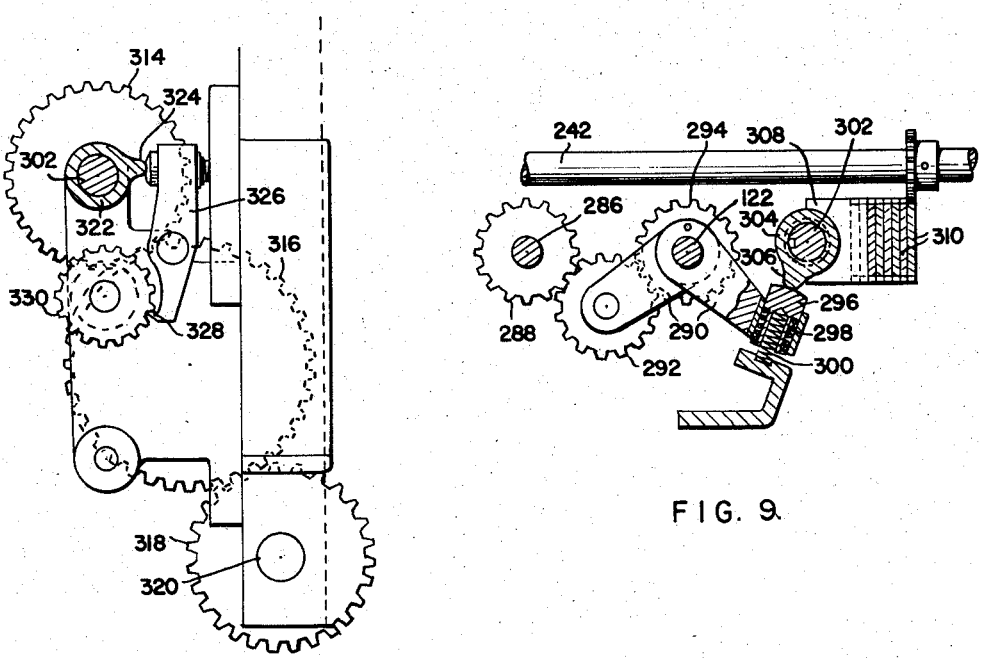
FIG. 9.
FIG. 10.
INVENTOR.
EINAR T. YOUNG

INVENTOR.
EINAR T. YOUNG

April 7, 1959  E. T. YOUNG  2,880,908
APPARATUS FOR DISPENSING AND PRICING SELECTED
BLENDS OF TWO LIQUIDS
Filed July 16, 1957  9 Sheets-Sheet 6

INVENTOR.
EINAR T. YOUNG
BY
ATTORNEYS

April 7, 1959     E. T. YOUNG     2,880,908
APPARATUS FOR DISPENSING AND PRICING SELECTED
BLENDS OF TWO LIQUIDS Filed July 16, 1957     9 Sheets-Sheet 7

INVENTOR.
EINAR T. YOUNG
BY
ATTORNEYS

April 7, 1959 E. T. YOUNG 2,880,908
APPARATUS FOR DISPENSING AND PRICING SELECTED
BLENDS OF TWO LIQUIDS
Filed July 16, 1957 9 Sheets-Sheet 8

INVENTOR.
EINAR T. YOUNG
BY
ATTORNEYS

2,880,908
APPARATUS FOR DISPENSING AND PRICING SELECTED BLENDS OF TWO LIQUIDS

Einar T. Young, Newtown Square, Pa., assignor to Sun Oil Company, Philadelphia, Pa., a corporation of New Jersey Application July 16, 1957, Serial No. 672,215

14 Claims. (Cl. 222—26)

This invention relates to metering means particularly adapted for the metering of base and additive components of a motor fuel.

Until recently, automotive fuels were quite generally sold by oil companies in various grades characterized by different octane ratings and differing in compositions particularly in the proportions therein of materials such as tetraethyl lead imparting to them anti-knock properties. The fuels of higher octane ratings sold by a particular company carried higher prices than those sold by the same company but of lower octane rating. Usually, a single company would sell only two grades, commonly designated "regular" and "high test" gasolines.

The present trend in automotive engineering is to supply engines with higher and higher compression ratios, the higher the compression ratio, the higher the octane rating of the fuel which should be used consistent with avoidance of "knock" when the engine is operating under conditions of high power output.

As newer cars replace older ones in general use, the gasolines which are sold have been required to have higher and higher octane ratings, the octane ratings of the "regular" gasolines being increased while the octane ratings of the "high test" gasolines have been correspondingly increased. Few cars, however, require for operation under normal conditions of use the high octane ratings of the "high test" gasolines, but a substantial number of cars require, for completely knockless operation, gasolines having an octane rating somewhat exceeding that of the usually sold "regular" gasolines. The majority of cars, however, particularly older ones in use, do not require even the octane rating of the "regular" gasolines. The purchaser of gasoline has had usually, at a particular gas station, only two choices of the gasoline which he might purchase, and for what he considered satisfactory operation of his car he might be required to purchase at a premium price the available "high test" gasoline, even though the actual requirements for car operation satisfactory to him would dictate a gasoline of octane rating intermediate between the "regular" and "high test" grades. The oil companies, however, must, in order not to lose business and good will, supply a "high test" gasoline which will operate satisfactorily under the most demanding driving conditions in those cars having the highest engine compression ratios. The resulting situation was unsatisfactory to both the oil companies and their customers. The ideal situation is that of having available to a particular car owner the particular grade of gasoline which his car and his driving habits demand consistent with economy. With a particular make of car, one owner may desire a gasoline which will give him completely knockless operation under all driving conditions, and he may demand such operation even though the conditions in which knocking might occur are very infrequent. Another owner of an identical car may have a quite different attitude, accepting knock under the few conditions for which it occurs but desiring for what he considers best economy of operation a less expensive gasoline which in his own views is quite satisfactory for the general conditions under which he drives. Some drivers keep careful check on the driving miles per gallon which they obtain; other drivers do not. In the sale of gasoline, however, the oil companies must satisfy all of these classes of car owners and drivers and must choose the ratings of their gasolines to secure the optimum customer reactions.

Mention has been made of the fact that usually, a particular gas station would sell no more than two grades of gasoline. Under those conditions, these grades were sold from separate pumps drawing their supplies from separate tanks. An attempt to retail more than two grades, in general, involved a prohibitive investment in separate tanks and pumps operating individually at low demand rates.

While the practice mentioned above is still widely prevalent, a different vending system has been used following the disclosures of the application of the present applicant, and Marsh, Serial No. 493,362, filed March 10, 1955, and of the present applicant, Serial No. 548,907, filed November 25, 1955. Specifically, there has been used the mechanism disclosed in the latter application whereby a single "pump" is provided for dispensing gasolines of various grades.

In accordance with the principles disclosed in said applications, the "pump" draws its supplies from two tanks. One of these tanks contains what will be hereafter referred to as a "base" gasoline which may have a minimum octane rating, and correspondingly low price, the octane rating being the economical minimum for which there may be any demand. The second tank may contain an "additive" which in itself may be a gasoline having an octane rating corresponding to the maximum for which there is any demand.

The purchaser of gasoline may, accordingly, specify the "grade" of gasoline he desires. This might be in terms of some approximate octane rating or, more practically, in terms of some arbitrary grade number which the gasoline vendor may publicize as having a certain range of octane rating or some guaranteeable minimum octane rating. The vendor can then set an adjustable device which will give to the purchaser the grade of gasoline which he demands. The mechanism then operates to supply to the tank of the car a mixture of the base and additive, or the base alone, or the additive alone, corresponding to the requested grade.

While said application of Young points out that the mechanism disclosed therein will indicate within limits of legal tolerance the proper price for what is actually delivered, particular prices being assigned to the base and the additive, it was conservatively suggested in said application that there might be some variation in the particular mixture delivered for any one setting of the mechanism. Consequently, it was originally assumed that it might not be possible to publish prices for the particular grades of gasoline delivered upon the various individual settings of the mechanism but that it might be necessary to indicate only approximate prices so that the customer would not be dissatisfied if a requested amount of gasoline might actually cost somewhat less or somewhat more than the approximate price. Experience with the mechanism of said Young application has shown that it operates consistently with a degree of precision which was not originally expected to the end that for a given setting for any particular grade the price may be accurately predicted for any normal quantity of gasoline required to fill the tank of a passenger automobile and even in general that required to fill the much larger tanks of trucks or the like. It has, accordingly, become possible to specify a definite price per gallon for each grade of gasoline which the mechanism may be set to deliver. From the merchandising standpoint it is highly desirable to assign prices as definite as possible for each grade.

In the application of Young and Marsh, Serial No. 601,441, filed August 1, 1956, the above considerations are taken into account and there is provided a semi-automatic display of the prices corresponding to various grades of gasoline which may be dispensed. In accordance with the last mentioned application, however, separate variators are operated by base and additive meters.

The authorities controlling weights and measures have now adopted as a satisfactory requirement only that a pump deliver the particular blend which is called for by the customer, and if that blend is delivered the vendor may quite arbitrarily fix the price of the blend, so long as the price is exhibited in connection with each blend and the price is applied to the total delivery during an operation of the pump.

The conventional variator, however, requires manual resetting for each price per gallon, and this setting, in general, involves independent settings of device for the tenth cent component of the price, the unit cent component, and the tens cent components. The settings, furthermore, should be made only by authorized personnel whereas usually gasoline stations are frequently operated by helpers, sometimes children, and it would be totatally impractical to reset a variator for each customer. The variator adjustments are not such as to lend themselves to resettings merely by crank or similar operations, and it is one object of the present invention to provide for the ready change of prices in accordance with the grades of gasoline requested without involving changes in variator settings except as the basic price of gasoline changes. In brief, in accordance with the invention, a single variator is provided which receives as its input a drive corresponding to the total volume of gasoline which is being dispensed, this variator providing a price output corresponding to the multiplication of the total gasoline dispensed by the price corresponding to the base alone. There is then provided, additionally, selective gearing of a type which may be readily changed, this selective gearing receiving as its input the total volume of gasoline dispensed and providing as an output the product of this total quantity by a monetary figure corresponding to the excess of price of the gasoline grade being delivered over the price of the base gasoline. The output of this selective gearing is then added to the output of the variator to provide a total price indication corresponding to the quantity of gasoline delivered multiplied by the price assigned to the grade delivered. The selective gearing just mentioned is reset in each operation of the pump concurrently with, and in dependence upon, the setting for control of the grade delivered. Furthermore, provision is made for exhibiting the price per gallon of the grade which the customer desires, this exhibition existing during the delivery operation.

The selective gearing is of a type which may be preset by an authorized person to select the difference prices of the available grades above the base grade. For example, assuming that besides the base alone there may be dispensed, say, five additional graves as may be established arbitrarily by the vendor, the vendor, having chosen prices for these grades may set the selective gearing to correspond to these prices so that when any of the five grades is to be dispensed the setting for control of composition of the gasoline will automatically put the selective gearing in condition resulting in a proper total price calculation. If the prices of the various grades are changed a resetting of the prices may be effected.

The foregoing and other objects of the invention having to do particularly with details of construction and operation will become apparent from the following description, read in conjunction with the accompanying drawings, in which:

Figure 4 is a similar section but taken on the broken surface indicated by the trace 4—4 in Figure 2;

Figure 9 is a vertical section taken on the plane indicated by the trace 9—9 in Figure 8;

Figure 10 is a vertical section taken on the surface indicated by the trace 10—10 in Figure 8;

Figure 1:
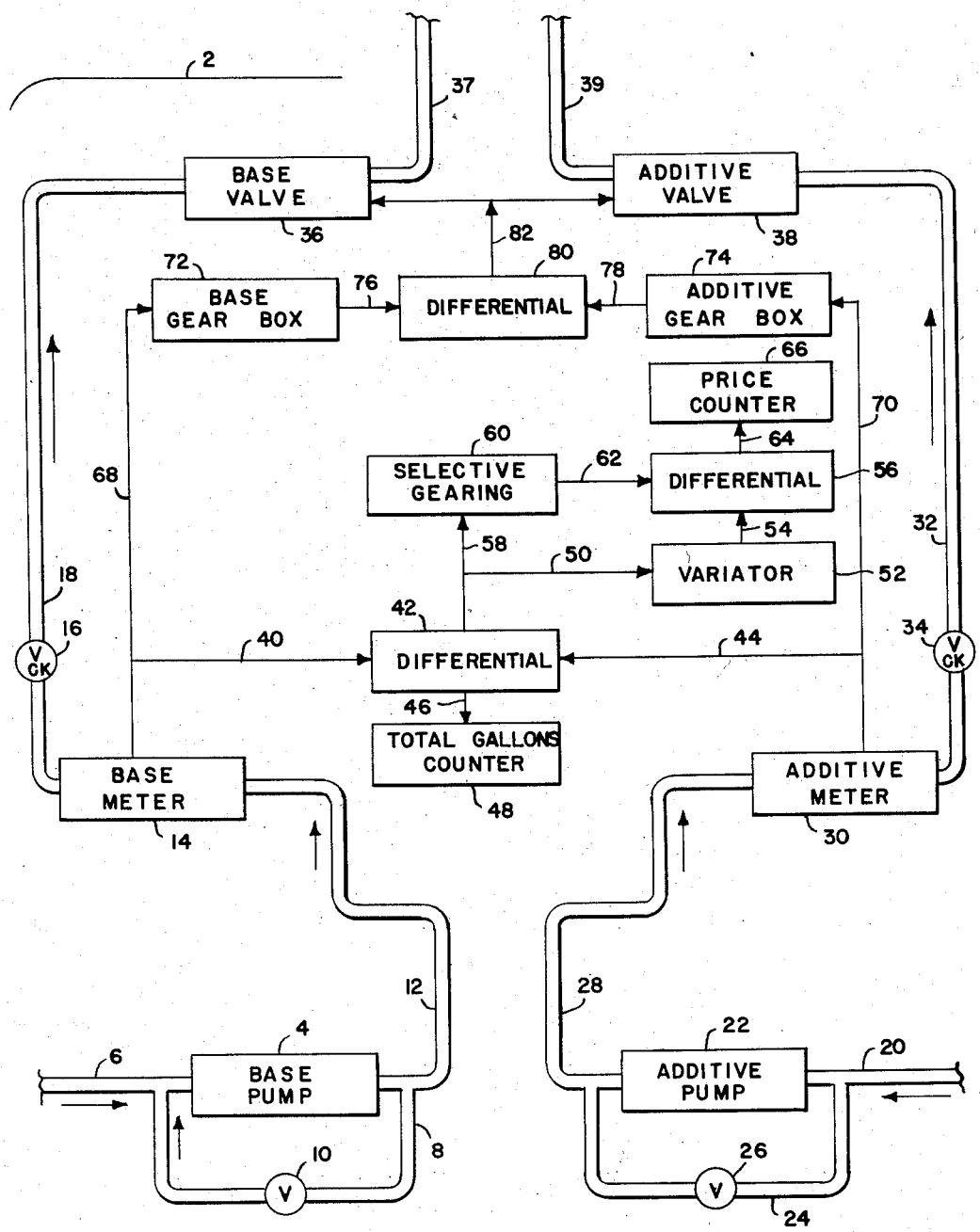
Figure 1 is a block diagram illustrating the liquid and mechanical connections of various elements involved in a preferred form of pump mechanism.

Referring first to Figure 1, there are diagrammed therein various elements which will be later described in detail. The "pump" housing indicated at 2 may be of generally conventional type, locked against unauthorized access, and provided with windows and various operating devices accessible from the outside of the pump as will hereafter appear. Where a pump generally is referred to hereafter it will be understood that it is this casing and the parts contained therein and associated therewith though possibly in the future certain of the parts conventionally included in such a housing may be located elsewhere. Included in the apparatus is the base pump 4 driven by a motor in usual fashion and provided with an inlet connection 6 from the base supply tank. As usual, a by-pass 8 is provided containing a relief valve 10 to by-pass the pump in the event that the delivery hose valve is closed. The base to be dispensed flows through connection 12 and a conventional meter 14 and thence through the pipe connection 18 incorporating a check valve 16.

A pump 22 for the additive draws its supply of additive from a tank through pipe connection 20. This pump 22 may be of the same type as the base pump 4 and is desirably driven by a separate motor. Associated with it is a by-pass 24 incorporating a relief valve 26.

The additive pump 22 delivers the additive through line 28 to the meter 30 which may be of the type serving to meter the base. Delivery from the meter 30 takes place through piping 32 which includes the check valve 34.

The base and additive delivered, respectively, through lines 18 and 32, are respectively controlled by the valves 36 and 38 from which they are delivered through conduits 37 and 39 which are connected to passages through a hose to a nozzle controlled by a valve as described in my application, Serial No. 548,907, referred to above.

The hose passages are maintained separate, communicating with each other only closely adjacent to the nozzle control valve, so that admixture of the two components cannot take place to any substantial degree so as to seriously change the composition delivered. The solid connecting lines provided with arrows in Figure 1 indicate mechanical connections the detailed nature of those which are novel being described hereafter. The base meter 14 provides one input 40 to a differential 42, the other input of which is provided at 44 from the additive meter 30. The output of the differential at 46 represents the sum of the quantities delivered by the two meters and operates the total gallons counter 48. This counter is arranged to indicate the total gallons delivered during an operation through a suitable window arrangement of the pump housing. A second output from the differential, also corresponding to total gallons, is delivered at 50 to a variator 52 in which is set the price per gallon ascribed to the base. The output 54 of this variator then represents the total gallons of both base and additive multiplied by the price of the base.

A second output from the differential, also corresponding to total gallons is provided at 58 to selective gearing indicated at 60 from which there is provided an output 62. As will appear in greater detail hereafter, the selective gearing effects the multiplication of the total gallons delivered by an amount corresponding to the excess of the price per gallon of a blend being delivered over the price per gallon ascribed to the base. The output from the selective gearing delivered at 62 provides an input to a differential 56, the other input of which is 54, the differential providing its output at 64 to a price counter 66 which is arranged to exhibit through a window arrangement in the pump housing the total price of the blend delivered.

Another output at 68 from the base meter 14 provides an input to a base gear box 72 while a corresponding output at 70 from the additive meter provides an input to an additive gear box 74. The outputs of these gear boxes at 76 and 78 drive differential 80, the output of which at 82 controls the relative positions of the base and additive valves 36 and 38. In brief, with particular settings of the base gear box and additive gear box, if the meters 14 and 30 indicate a proper ratio of deliveries of base and additive, the output at 82 is zero and does not affect the settings of the valves 36 and 38. On the other hand, if this correspondence does not exist, an output at 82 adjusts the valves to control the composition of the delivered blend.

Figure 2:
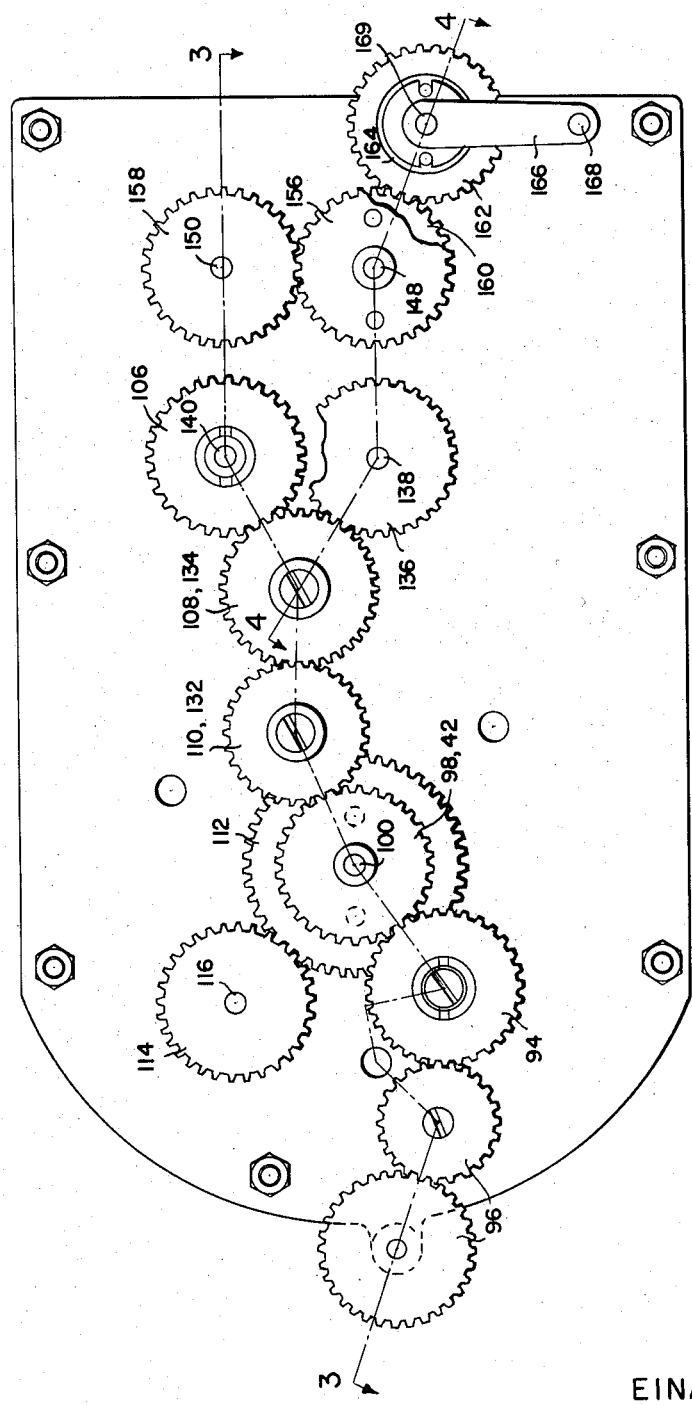
Figure 2 is an inverted plan view of part of the mechanism, showing, in particular, gear trains for the operations of various parts.
Figure 3:
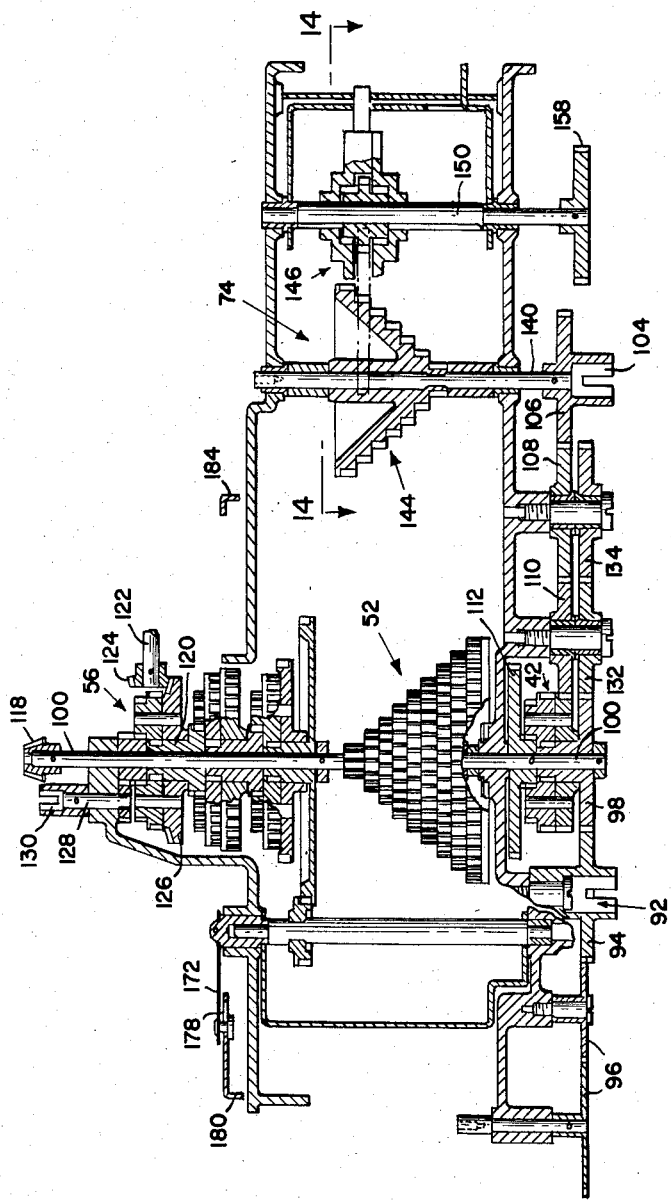
Figure 3 is a vertical sectional view showing parts of a variator and certain controlling means, the section being taken on the broken surface indicated by the trace 3—3 in Figure 2.

Reference may now be made particularly to Figures 2, 3 and 4. The coupling indicated at 92 connects to a shaft driven by the base meter and supplies the inputs which are indicated in Figure 1 at 40 and 68. The coupling forms part of a gear 94 which through gears 96 may drive a counter to record the total amount of base delivered over an extended period of time, this counter not being shown. Gear 94 also drives a gear 98 which constitutes one input of the differential 42 previously referred to, the gear 98 being mounted for free rotation on the shaft 100.

The coupling 104 is connected to a shaft driven by the additive meter 30 and constitutes part of the connections 44 and 70 previously mentioned. The coupling forms part of a gear 106 which provides through gears 108 and 110 a second input to the differential 42, the output of which differential corresponding to total gallons is provided through the shaft 100. Secured to this shaft is a gear 112 which drives a gear 114 to drive, in turn, a vertical shaft 116 to which further reference will be made hereafter, it being noted that rotation of shaft 116 corresponds to total gallons delivered.

A bevel pinion 118 secured to shaft 100 drives the total gallons counter which is indicated at 48 in Figure 1, the pinion 118 forming a physical part of the mechanical drive connection indicated at 46.

Figure 8:
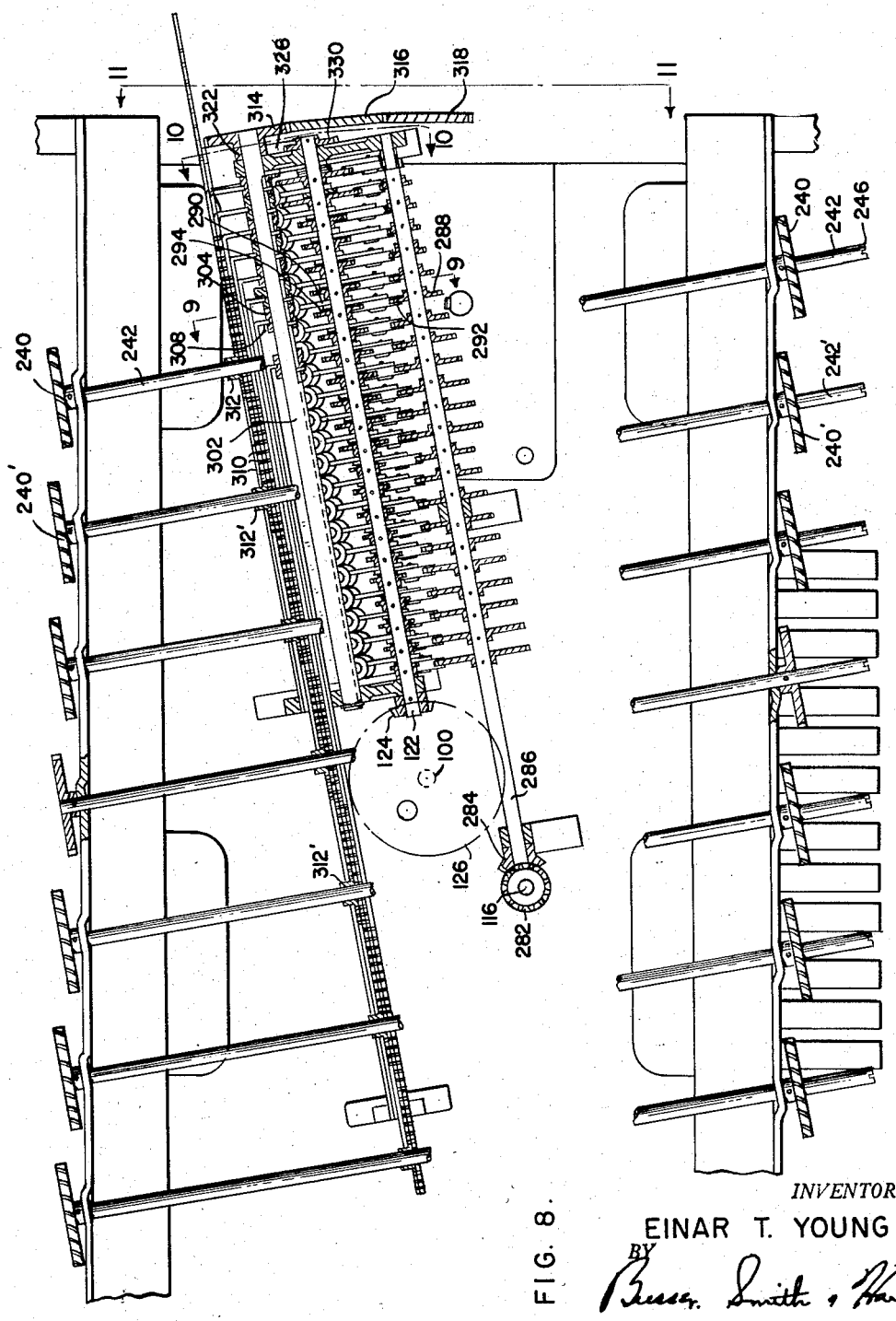
Figure 8 is a horizontal sectional view showing the selective gearing previously referred to and various connections thereof.

The vertical shaft 116 provides a drive input, corresponding to 58 in Figure 1, to selective gearing indicated at 60 and detailed particularly in Figure 8. Passing for the present these details, the output shaft 122 of this selective gearing 60 provides an input, corresponding to 62, to a differential, diagrammed at 56 in Figure 1 and shown in Figure 3. The shaft 122 carries a bevel pinion 124 meshing with a gearing 126 to provide one input to the differential, the other input being from the gear 120 which constitutes the normal output of the variator 52. The output from the differential is delivered through shaft 128 and coupling 130 (constituting the connection 64) to the price counter 66.

Figure 14:
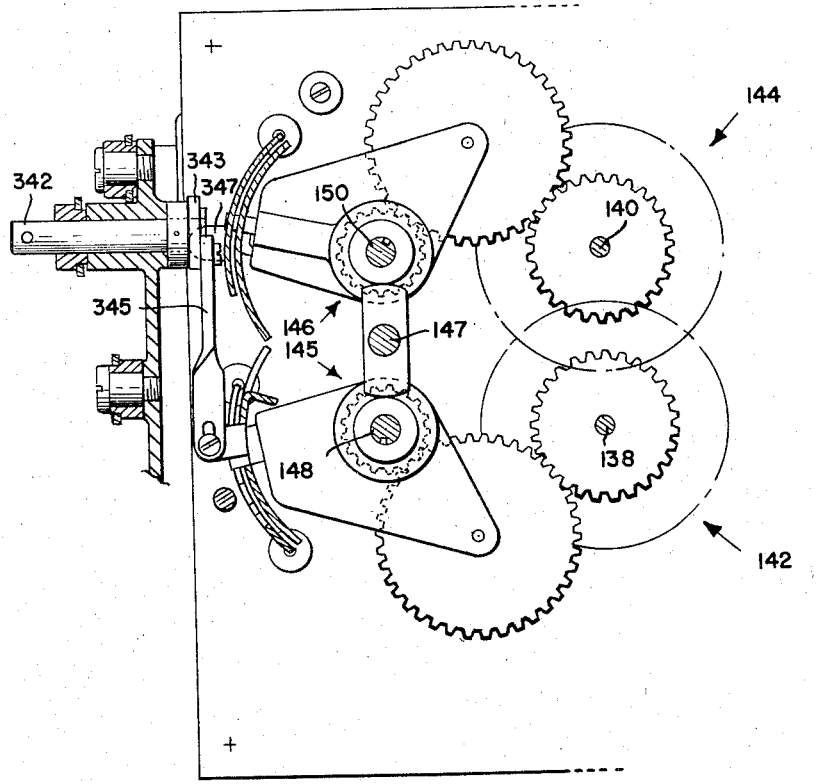
Figure 14 is a fragmentary section taken on the plane indicated at 14—14 in Figure 3.

Gear 98, the rotations of which, correspond to gallons of base, drives through gears 132, 134 and 136 the input shaft 138 of the base gear box indicated at 72 in Figure 1 and shown more particularly in Figure 4. The shaft 140 connected to gear 106, previously mentioned, provides the input to the additive gear box 74 which is shown in Figure 3. Shaft 138 carries the gear cone 142 while shaft 140 carries the gear cone 144. The cones 142 and 144 are respectively arranged to drive through shiftable gearing 145 and 146 the respective shafts 148 and 150 (see Figure 14). The shaft 148 provides one input to the differential 80 through the pinion 152 secured to the shaft while the shaft 150 provides a second input to the differential through gear 158 meshing with gear 156. The output from the differential, diagrammed at 82 in Figure 1, is delivered through gears 160 and 162 arranged to drive through a clutch 164, which may slip if overloaded, an arm 166 which by link connection to a pin 168 controls concurrently the base valve 36 and the additive valve 38. These valves may be provided as described in my application, Serial No. 548,907, referred to above, the arrangement being such that as one valve opens the other valve closes, the relative positions of the valves controlling the proportioning of the components. The type of control here involved, except for physical details, is substantially that of my prior application and forms, per se, no part of the present invention so that it need not be further discussed in detail. Briefly, the operation is as follows:

The settings of the gear boxes 72 and 74 determine the relative flows which would be required to maintain at zero the output of differential 80 to hold the valves in fixed relative position. If the rate of flow of additive relative to base exceeds the predetermined ratio, the differential 80 will have an output of such direction as to move the additive valve toward closed position and the base valve toward open position. The result is readjustment of the individual flows to a ratio predetermined by the gear box settings and resulting in zero output from differential 80. If the base flow is in excess a reverse output from the differential occurs, resulting in correction of the ratio of the flows. Thus, the composition delivered is maintained at a predetermined fixed value. The shaft 169 which carries the arm 166 is connected to a gear arrangement 170 which is of the type disclosed in my prior application to provide for setting of the valves to deliver solely base or solely additive.

Figure 5:
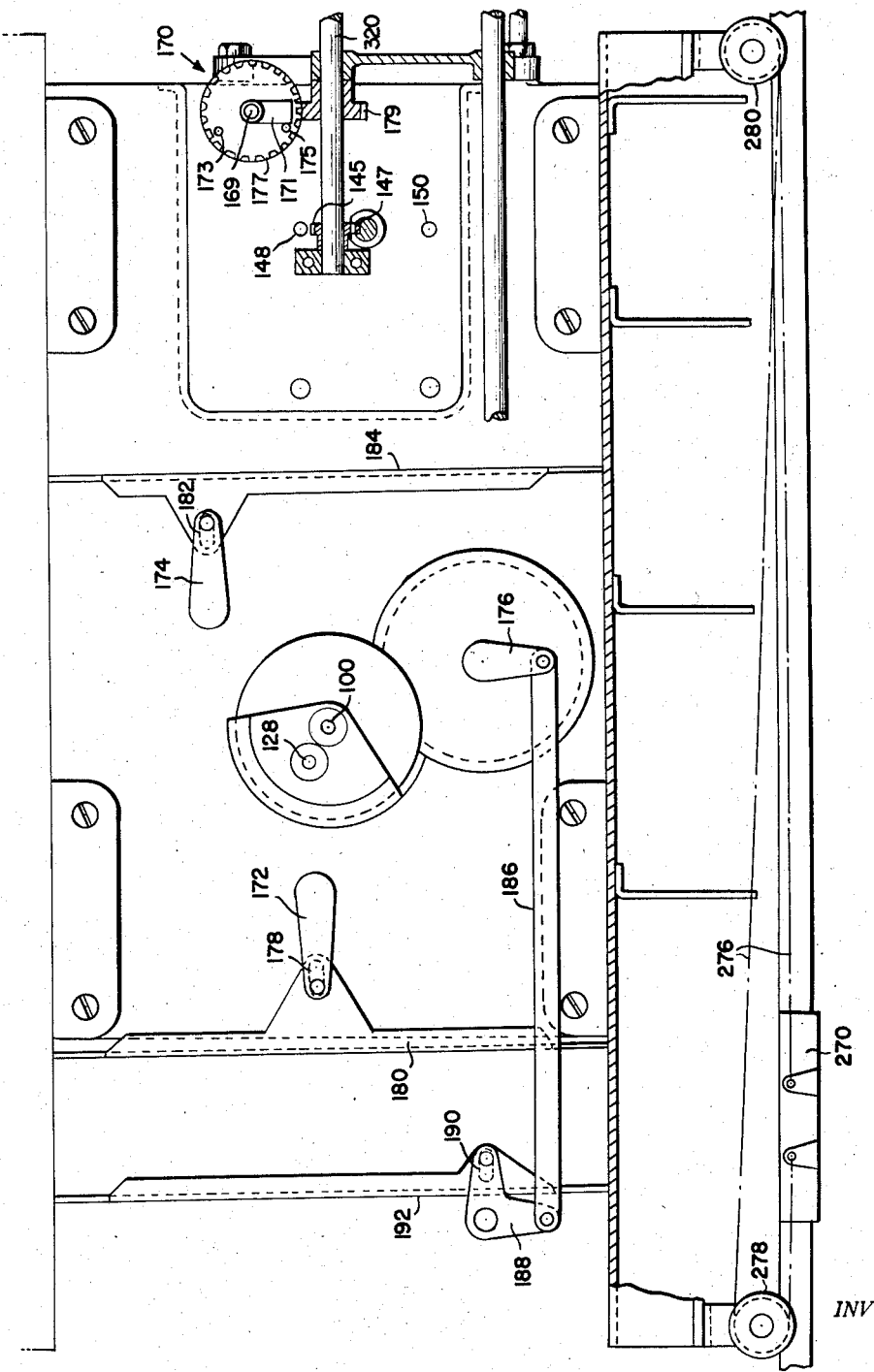
Figure 5 is a horizontal section showing, in particular, certain elements associated with the variator adjusting means, together with a slide controlling the exhibition of blend prices.

The arrangement is shown also at the right in Figure 5 wherein the shaft 169 is shown as provided with an arm 171 engageable with pins 173 and 175 carried by a gear 177 of helical type arranged to be adjusted through a helical gear 179 secured to shaft 320 which will be hereafter more fully described and which through pinion 145 and rack 147 is arranged to slide the gears which mesh with the cones 142 and 144 for the driving of shafts 148 and 150.

Figure 6:
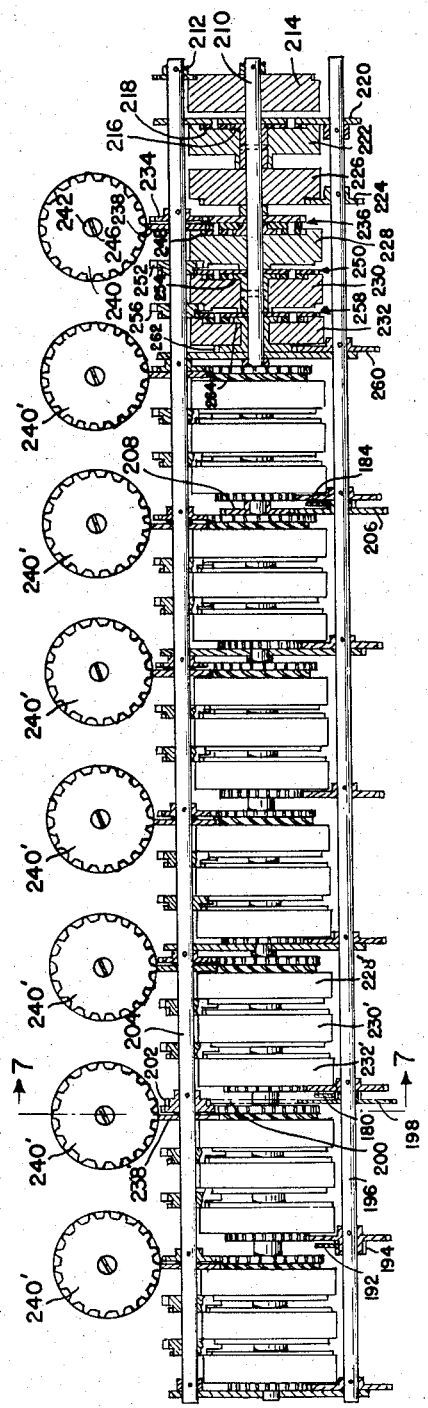
Figure 6 is a sectional view showing, particularly, adjusting and controlling means for the devices exhibiting blend prices, the section being taken on the broken surface indicated by the trace 6—6 in Figure 7.
Figure 7:
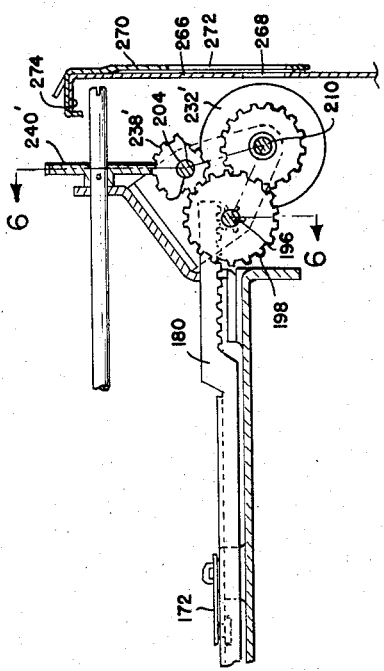
Figure 7 is a vertical section taken on the broken surface indicated by the trace 7—7 in Figure 6.

Reference may now be made to Figure 5 which shows certain connections made to variator setting arms. A conventional variator of the type shown at 52 is arranged to be manually set for a price, in this case the base price, by arms such as 172, 174 and 176 which respectively control the tenth cent, the unit cent and the tens cents figures of the price per gallon. The arm 172 has a pin and slot connection at 178 with a slide 180 provided with rack portions (Figures 6 and 7). The arm 174 has a similar pin and slot connection at 182 with a slide 184 which is also provided with rack portions. The arm 176 is connected by link 186 to a bell crank 188 which has a pin and slot connection at 190 with a third slide 192 provided with rack portions.

The rack on slide 192 meshes with a pinion 194 pinned to a shaft 196. The rack on slide 180 meshes with a small diameter portion of a pinion 198 which is provided with a large diameter gear meshing with a pinion 202 pinned to a shaft 204. (The fact of meshing is indicated in construction lines at 200. Note the nature of the sectioninvolved in Figure 6 by reference to the section lines 6—6 in Figure 7.) The rack on slide 184 meshes with a pinion forming part of a gear 206 which meshes with a gear 208 pinned to a shaft 210. In accordance with the foregoing, the respective shafts 196, 204 and 210 have imparted to them from the adjusting arms of the variator movements which are proportional to the tens of cents, the tenths of cents and the unit cents components of the base price set into the variator. The assembly shown in Figure 6 is for the exhibiting of the prices of the various grades of gasoline which may be dispensed including that grade provided by the base alone.

The shaft 204 has secured to it a pinion 212 which meshes with teeth provided on a drum 214 which is journalled on the shaft 210, the position of the drum 214 exhibiting the proper tenth cents component of the base price. A pinion 216 is pinned to the shaft 210 and meshes with idler pinions 218 mounted on pins fixed in the supporting frame, these idlers in turn meshing with internal teeth on a second drum 222 the position of which exhibits the unit cents of the base price. A pinion 224 pinned to shaft 196 meshes with teeth on a third drum 226 which is journalled on the shaft 210 to exhibit the tens cents component of the base price. The three drums 214, 222 and 226, therefore, taken together, exhibit the base price.

The next three drums 228, 230 and 232 are arranged to indicate the price of the grade of gasoline next higher than the base. These drums, as well as others which will be mentioned, are mounted concentrically with the shaft 210. These drums are driven through differential arrangements since they must be set not only in accordance with the base price but also in accordance with the price increment between the base and the gasoline grade to which they correspond. For this purpose, considering first the drum 228, a pinion 234 secured to shaft 204 provides one input to a differential indicated at 236, the other input of which is derived from a helical gear 238 journalled on the shaft 204 and driven by a helical gear 240 mounted on a shaft 242, the shaft being provided with a screwdriver slot 246 for its adjustments. The output of the differential 236 drives the drum 228 through its internal teeth 248.

In association with the drum 230 there is a differential 250 which receives one input through a set of carrying means 252 from the drum 228 and its other input from a pinion 254 secured to the shaft 210. The carrying means 252 is of standard type with the exception that it imparts movement to the drum 230 through the differential 250 rather than directly. The output of this differential drives the drum 230. A carrying arrangement 256 journalled on the shaft 204 provides carrying from the drum 230 to one input of the differential 258, the other input of which is from pinion 260 secured to shaft 196 through the meshing gear 262 carried by a hub journalled on shaft 210, which hub carries a pinion 264 to provide an input to the differential. The output from the differential drives the drum 232.

The drums 228, 230 and 232 by reason of the mechanism just described have respective inputs from the shafts 204, 210 and 196 and also from the shaft 242 and the carrying means 252 and 256, the several differentials serving for the adding of these independent inputs. Rotation manually imparted to the shaft 242 corresponds to the difference in price per gallon between the base and the grade of gasoline to which the drums 228, 230 and 232 correspond. In the case of a number of grades the difference in price may be of the order of one or a few cents established to an accuracy of a half cent and consequently the price differential input may be provided in terms of fractions, i.e., half cents. Assuming practically that the differentials have as least amounts half cent increments, consistent with what is herein disclosed specifically, the gear 240 may be provided with a series of detents (not shown) if, for example, a quarter turn corresponds to a half cent. In the setting of the shaft 242 the attendant performing this operation may, of course, watch the indications on the drums to determine when he arrives at a proper setting.

As will be noted from Figure 6, additional groups of price-indicating drums corresponding to 228, 230 and 232 are repeated along the length of shaft 210. These may be identical in construction with the exhibiting arrangement just described and correspond to other grades of gasoline which are to be vended. These additional exhibiting arrangements have some of their parts designated by the same numerals already used with primes appended. Since it is generally desirable to exhibit prices on opposite sides of a gasoline pump, what is shown in Figure 6 is duplicated on the other side of the pump but with the order of exhibition of prices reversed from the standpoint of an observer at the other side of the pump. To keep the indications the same the shafts 242 and 242' are extended across the pump, being provided with corresponding gears 240 and 240' for the drive of the indicators. The reason why these shafts are arranged diagonally as indicated in Figure 8 is because in the case of each group the tenth cent drums must be located at the right of the group.

Figure 7 indicates the fashion in which exhibition of prices occurs. A masking wall 266 is provided with openings 268 horizontally aligned with the drums which carry the price indicating numerals. To indicate the particular grade of gasoline which is being delivered a movable mask 270 is provided with an opening 272 which aligns selectively with the windows 268 and with a portion of the wall 266 thereabove on which may be printed some arbitrary or other designation of gasoline grade. Printed on the mask 270 may be some indication such as an arrow indicating the grade of gasoline being delivered. The mask 270 is in the form of a slide supported on a track 274, and operated by a cord 276 trained about pulleys 278 and 280 and operated from a drum 350 (Figure 12) the drive of which will be later described. By the same traversing cord arrangement a mask 270 is operated on the other side of the pump from that particularly illustrated in Figure 5. One or a plurality of windows on each side of the housing 2 provide visibility of the indications.

Referring, now, particularly to Figures 8, 9 and 10, the shaft 116 (see Figure 2) which has rotation corresponding to total gallons being delivered carries a bevel pinion 282 meshing with a second bevel pinion 284 to drive through input shaft 286 selective gearing which is indicated at 60 in Figure 1 and is shown in the figures now under discussion. The output of this selective gearing is through shaft 122, pinion 124 and gear 126 (see Figure 3) providing the input to the differential 56 wherein the output is added to the output at 54 from the variator to exhibit the total price on counter 66. In the present disclosure the selective gearing is provided in a form to add one half cent increments beginning with a one cent increment to the price per gallon, and for this purpose gears 288 secured to the shaft 286 are properly graduated in numbers of teeth with, as will be understood, provision for meshing with other gears having proper numbers of teeth for the pricings desired. Bell cranks 290 are journalled on shaft 122 and carry individual idlers 292 which operate between the gears 288 and gears 294 individually secured to shaft 122. Each of the bell cranks is provided with a cam follower 296 slidable therein and urged upwardly, as viewed in Figure 9, by a spring 298, there being also provided in the case of each bell crank a spring 300 reacting between the follower 296 and a fixed element of the frame in such fashion as to disengage a corresponding idler 292 from a corresponding gear 288. A shaft 302 extends parallel to shaft 122 and has splined thereon a group of collars 304 which are individually provided with cam projections 306 arranged to engage the followers 296. The cams 306 are eight in number and together with a cam 324 which will be later particularly referred to are spaced at 40° intervals about the shaft 302 so that when this shaft is rotated in 40° steps there will at any one time be engaged with a follower only one of the cams 306 or 324. The collars 304 are provided with peripheral grooves within which engage the inturned ends 308 of stacked slides 310 which are provided with rack teeth engaged by pinions 312 and 312' secured to the various shafts 242 and 242'. Thus, each of these shafts in its rotation serves to control the position lengthwise along shaft 302 of one of the collars 304. The arrangement is such that when any shaft of the group 242 and 242' is positioned to correspond to a certain incremental price per gallon its corresponding collar 304 is moved into alignment with the follower 296 of a bell crank associated with a particular set of gears having a ratio corresponding to this price increment. For example, considering the specific shaft 242, if it is set for a price increment of one cent per gallon over the base price the most right hand collar 308 corresponding thereto will be in alignment with the most right hand follower 296 corresponding to the most right hand set of gears shown in Figure 8. On the other hand, if the price increment should be one and one-half cents then the setting of shaft 242 will effect movement of the same collar into alignment with the second follower corresponding to the second set of gears. The arrangement, as illustrated, provides for the selective delivery of nine grades of gasoline including that corresponding to the base alone and that corresponding to the additive alone, and as will be evident the eight more costly grades may have their prices set to correspond individually to selected ones of twenty-three price increments differing successively by half cent increments.

The shaft 302 is arranged to be angularly adjustable through gearing 314, 316 and 318 from a selecting shaft 320.

The hub 322 of gear 314 which is secured to shaft 302 is provided with a cam 324 arranged to operate on the follower of a lever 326, this follower and associated spring arrangements being similar to what has already been described in connection with the follower 296. In this case the lever 326 is provided with a finger 328 which is arranged to engage between teeth of a gear 330 secured to the shaft 122 to lock this shaft in fixed position when base alone is being delivered, the delivery of base alone corresponding to the position of shaft 302 at which cam 324 engages the follower of lever 326. Without this locking arrangement the shaft 122 would be free to rotate out of control and thus involve improper operation of the differential 56. What the locking amounts to is, in effect, a zero input to the differential from the shaft 122 depsite the rotation of shaft 116.

Figure 11:
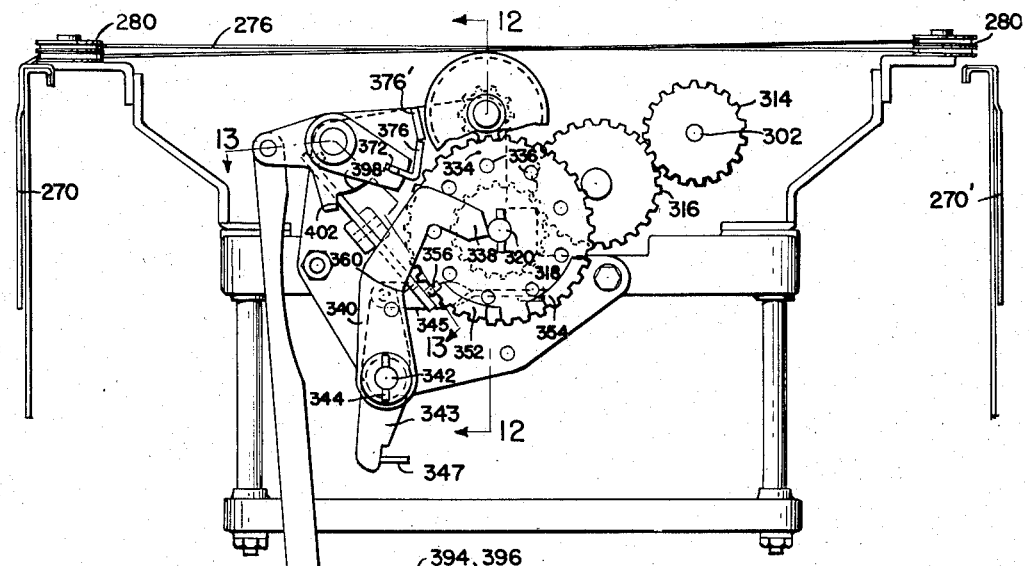
Figure 11 is an elevation looking at the right hand portion of Figure 8 from the plane indicated at 11—11 in Figure 8.
Figure 12:
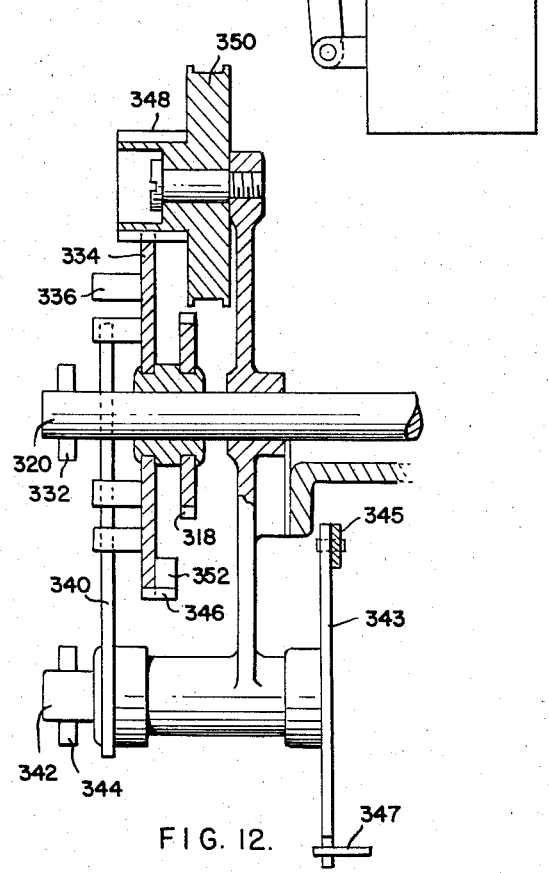
Figure 12 is a vertical section taken on the broken surface indicated by the trace 12—12 in Figure 11.
Figure 13:
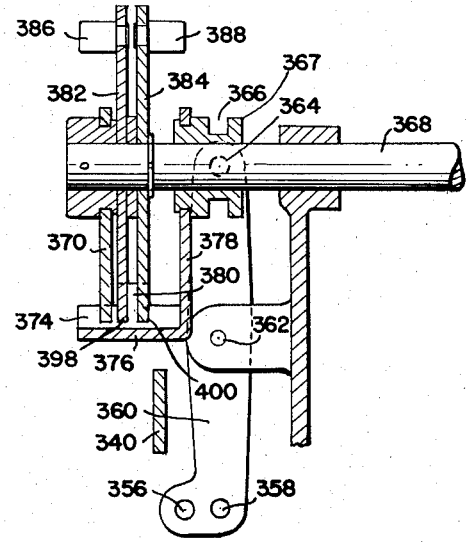
Figure 13 is a fragmentary section taken on the broken surface indicated by the trace 13—13 in Figure 11.

Reference may now be made particularly to Figures 11, 12 and 13. The shaft 320 is provided with a transverse pin 332 to be engaged by a knob, not illustrated, accessible from the exterior of the pump. Rotation of this knob adjusts the shaft 320 to one of nine selected angular positions to determine the grade of gasoline to be delivered. The shaft 320 carries a disc 334 provided with nine equiangularly spaced pins 336 between pairs of which there is arranged to engage the nose portion 338 of a lever 340 carried by a shaft 342 and provided with a transverse pin 344 to provide coupling to the shaft of a handle (not illustrated) available for manipulation at the exterior of the pump. Unless this handle is manipulated to rock the lever 340 counterclockwise as viewed in Figure 11 the shaft 320 cannot be adjusted. The disc 334 is provided at its periphery with teeth 346 meshing with teeth 348 provided on the hub of the drum 350 which operates the cord 276 previously described for movement of the masks 270.

The periphery of the disc 334 is deformed at 352 and 354 to provide cams, the teeth being cut in this disc after its deformation. These cams operate between pins 356 and 358 carried by a lever 360 which is pivoted at 362 to the supporting frame and provided with a pin 364 re-received in a groove 366 in a hub member 367 arranged to slide and rotate on a shaft 368. The shaft 368 has connected to it an arm which is not shown but which provides a support for the usual hose nozzle exteriorly of the pump casing. The arrangement is such that when the nozzle is thus supported the shaft 368 occupies the counterclockwise position illustrated in Figure 11 wherewhen the nozzle is removed for delivery of gasoline the shaft 368 is spring operated to a clockwise position. The shaft 368 is provided with an arm 370 provided with a slot 372 within which there engages slidably and continuously an elongated flange 374 carried by a laterally extending portion 376 of an arm 378 secured to the hub 367. A second laterally extending portion of this arm indicated at 376' is also provided and the portions 376 and 376' are so arranged that when the hose nozzle is removed from its support the clockwise rotation of shaft 368 moves these behind the lever 340 so that its nose 338 cannot be removed from between a pair of the pins 336. This provides an interlock to prevent resetting of shaft 320 so long as the hose is removed from its support.

The flange 374 is provided with an upward extension 380, as viewed in Figure 13. Journalled on the shaft 368 are levers 382 and 384 provided with pins 386 and 388 which are connected by respective links 390 and 392 to individual switches 394 and 396 for the separate motors which individually drive the pumps for the base and additive. The levers 382 and 384 are provided with slots 398 and 400 at their edges adjacent to flange extension 380 and the ends 402 of these slots are selectively engageable by the extension 380 in the following fashion:

As indicated in Figure 13, this extension may occupy a central position in which it may engage the ends of the slots in both of levers 382 and 384. If the extension 380 is moved toward the left as viewed in Figure 13 it may engage only the lever 382, whereas if it is moved to the right it may engage only the lever 384. The selective engagement is controlled by the cams 352 and 354 and the plane portion of the disc 334, the arrangement being such that when the shaft 320 is positioned to engage base only the base pump operating motor will alone be operative from its switch, whereas if additive only is to be delivered there will be operated only the motor which drives the additive pump. Whenever blends of these two constituents are to be delivered both motors are operated.

The play provided by the elongated slots 398 and 400 is for the purpose of providing for winding up of the counter resetting spring during operation, such resetting of the quantity and price counters being effected in conventional fashion as in the usual gasoline pumps.

From the foregoing description the overall operation of the pump will be clear. With the hose nozzle in its position supported by shaft 368, the motors driving the individual pumps are stomped and resetting of the counters have not been effected from the positions occupied as the result of a previous delivery. When a customer now calls for a particular grade of gasoline, the operator will first rock shaft 342 to free the nose 338 of lever 340 from between a pair of pins 336 and shaft 320 may then be rotated by its operating knob to a position corresponding to the grade of gasoline desired. The rotation of shaft 320 moves the mask 270 to indicate the grade to be delivered and exhibit on the proper set of numeral wheels shown in Figure 6 the price of the desired gasoline, this exhibition occurring on both sides of the pump. At the same time the shaft 302 is rocked to produce meshing of the set of gears shown in Figure 8 corresponding to the increment over the base price of the price of the gasoline grade selected. At the same time through the pinion and rack arrangement at 145 and 147 (Figures 5 and 14) gear selection is made in the base and additive gear boxes 72 and 74 for proper control of the valves 36 and 38 to correspond to the grade desired, manipulation of shaft 342 serving through attached lever 343, link 345 and ear 347 to unmesh the adjustable gearing to permit gear selection. When the hose is then removed from its support zeroizing of the gallon and price counters is effected and either one or both of the pump motors started, upon closure of a main switch (not shown), depending upon whether base alone, additive alone, or a blend has been called for. During the delivery of the gasoline the differential 42 adds the quantities passing through the base meter and additive meter and delivers an input to both the variator 52 and to the selective gearing 60 corresponding to the total gallons being delivered. The output of the variator is added to that of the selective gearing 60 by the differential 56 to provide exhibition of the total price on counter 66. Through the control by the base and additive gear boxes the blend is maintained as desired.

At the end of the operation as the hose is replaced on its support the motor or motors are stopped and the exhibiting of total gallons and total price remains until operation is again initiated.

Whenever it is desired to change the price of the base the usual adjustments of the variator 52 may be made. If it is desired to readjust the increments of price corresponding to the various grades the corresponding shafts 240 or 240' are adjusted with resulting sliding of the collars 304 along shaft 302 and with concurrent readjustment of the price exhibiting means of Figure 6, these operations being as heretofore fully described. These last price adjusting operations require access to the interior of the pump casing which will normally be locked against unauthorized access.

It will be evident from the foregoing that there is provided a pump effecting the attainment of the objects of the invention as described in the introduction to this specification. It will be evident that various changes may be made in details of construction and mode of operation without departing from the invention as defined in the following claims.

What is claimed is:

1. Apparatus for the simultaneous vending of two liquids comprising metering means providing an output corresponding to the total delivery of said liquids, a variator receiving said output and adjustable to provide a second output corresponding to the amount of said total delivery multiplied by a unit price, a variable gear mechanism also receiving the first mentioned output and providing a third output corresponding to the amount of said total delivery multiplied by a unit price, means adding the second and third outputs to provide an indication of total price of said total delivery, valve means controlling the delivery of said liquids, and controlling means for said valve means to effect delivery of said liquids in substantially a predetermined ratio.

2. Apparatus for the simultaneous vending of two liquids comprising metering means providing an output corresponding to the total delivery of said liquids, a variator receiving said output and adjustable to provide a second output corresponding to the amount of said total delivery multiplied by a unit price, a variable gear mechanism also receivng the first mentioned output and providing a third output corresponding to the amount of said total delivery multiplied by a unit price, means adding the second and third outputs to provide an indication of total price of said total delivery, valve means controlling the delivery of said liquids, and controlling means for said valve means settable in accordance with the setting of said variable gear mechanism to effect delivery of said liquids in substantially a predetermined ratio.

3. Apparatus for the simultaneous vending of two liquids comprising metering means providing an output corresponding to the total delivery of said liquids, a variator receiving said output and adjustable to provide a second output corresponding to the amount of said total delivery multiplied by a unit price, a variable gear mechanism also receiving the first mentioned output and providing a third output corresponding to the amount of said total delivery multiplied by a unit price, means adding the second and third outputs to provide an indication of total price of said total delivery, valve means controlling the delivery of said liquids, controlling means for said valve means to effect delivery of said liquids in substantially a predetermined ratio, and means exhibiting a total price for the delivered liquids settable in accordance with the combined adjustment of said variator and setting of said variable gear mechanism.

4. Apparatus for the simultaneous vending of two liquids comprising metering means providing an output corresponding to the total delivery of said liquids a variator receiving said output and adjustable to provide a second output corresponding to the amount of said total delivery multiplied by a unit price, a variable gear mechanism also receiving the first mentioned output and providing a third output corresponding to the amount of said total delivery multiplied by a unit price, means adding the second and third outputs to provide an indication of total price of said total delivery, valve means controlling the delivery of said liquids, controlling means for said valve means settable in accordance with the setting of said variable gear mechanism to effect delivery of said liquids in substantially a predetermined ratio, and means exhibiting a total price for the delivered liquids settable in accordance with the combined adjustment of said variator and setting of said variable gear mechanism.

5. Apparatus for the simultaneous vending of two liquids comprising meters individually measuring said liquids, means driven by said meters and providing an output corresponding to the total delivery of said liquids, a variator receiving said output and adjustable to provide a second output corresponding to the amount of said total delivery multiplied by a unit price, a variable gear mechanism also receiving the first mentioned output and providing a third output corresponding to the amount of said total delivery multiplied by a unit price, means adding the second and third outputs to provide an indication of total price of said total delivery, valve means controlling the delivery of said liquids, and controlling means for said valve means to effect delivery of said liquids in substantially a predetermined ratio.

6 Apparatus for the simultaneous vending of two liquids comprising meters individually measuring said liquids, means driven by said meters and providing an output corresponding to the total delivery of said liquids, a variator receiving said output and adjustable to provide a second output corresponding to the amount of said total delivery multiplied by a unit price, a variable gear mechanism also receiving the first mentioned output and providing a third output corresponding to the amount of said total delivery multiplied by a unit price, means adding the second and third outputs to provide an indication of total price of said total delivery, valve means controlling the delivery of said liquids, and controlling means for said valve means settable in accordance with the setting of said variable gear mechanism to effect delivery of said liquids in substantially a predetermined ratio.

7. Apparatus for the simultaneous vending of two liquids comprising meters individually measuring said liquids, means driven by said meters and providing an output corresponding to the total delivery of said liquids, a variator receiving said output and adjustable to provide a second output corresponding to the amount of said total delivery multiplied by a unit price, a variable gear mechanism also receiving the first mentioned output and providing a third output corresponding to the amount of said total delivery multiplied by a unit price, means adding the second and third outputs to provide an indication of total price of said total delivery, valve means controlling the delivery of said liquids, controlling means for said valve means to effect delivery of said liquids in substantially a predetermined ratio, and means exhibiting a total price for the delivered liquids settable in accordance with the combined adjustment of said variator and setting of said variable gear mechanism.

8. Apparatus for the simultaneous vending of two liquids comprising meters individually measuring said liquids, means driven by said meters and providing an output corresponding to the total delivery of said liquids, a variator receiving said output and adjustable to provide a second output corresponding to the amount of said total delivery multiplied by a unit price, a variable gear mechanism also receiving the first mentioned output and providing a third output corresponding to the amount of said total delivery multiplied by a unit price, means adding the second and third outputs to provide an indication of total price of said total delivery, valve means controlling the delivery of said liquids, controlling means for said valve means settable in accordance with the setting of said variable gear mechanism to effect delivery of said liquids in substantially a predetermined ratio, and means exhibiting a total price for the delivered liquids settable in accordance with the combined adjustment of said variator and setting of said variable gear mechanism.

9. Apparatus for the simultaneous vending of two liquids comprising metering means providing an output corresponding to the total delivery of said liquids, a variator receiving said output and adjustable to provide a second output corresponding to the amount of said total delivery multiplied by a unit price, a variable gear mechanism having a group of gear elements individually corresponding to price increments, means for selecting a subgroup of said group for possible operation while leaving others of said group inactive, means for selecting for operation gear elements of said subgroup, means providing to said variable gear mechanism the first mentioned output, thereby to provide from said variable gear mechanism a third output corresponding to the amount of said total delivery multiplied by the price increment corresponding to said selected gear elements of said subgroup, means adding the second and third outputs to provide an indication of total price of said total delivery, valve means controlling the delivery of said liquids, and controlling means for said valve means to effect delivery of said liquids in substantially a predetermined ratio.

10. Apparatus for the simultaneous vending of two liquids comprising metering means providing an output corresponding to the total delivery of said liquids, a variator receiving said output and adjustable to provide a second output corresponding to the amount of said total delivery multiplied by a unit price, a variable gear mechanism having a group of gear elements individually corresponding to price increments, means for selecting a subgroup of said group for possible operation while leaving others of said group inactive, means for selecting for operation gear elements of said subgroup, means providing to said variable gear mechanism the first mentioned output, thereby to provide from said variable gear mechanism a third output corresponding to the amount of said total delivery multiplied by the price increment corresponding to said selected gear elements of said subgroup, means adding the second and third outputs to provide an indication of total price of said total delivery, valve means controlling the delivery of said liquids, and controlling means for said valve means settable in accordance with said selection of gear elements of said subgroup to effect delivery of said liquids in substantially a predetermined ratio.

11. Apparatus for the simultaneous vending of two liquids comprising metering means providing an output corresponding to the total delivery of said liquids, a variator receiving said output and adjustable to provide a second output corresponding to the amount of said total delivery multiplied by a unit price, a variable gear mechanism having a group of gear elements individually corresponding to price increments, means for selecting a subgroup of said group for possible operation while leaving others of said group inactive, means for selecting for operation gear elements of said subgroup, means providing to said variable gear mechanism the first mentioned output, thereby to provide from said variable gear mechanism a third output corresponding to the amount of said total delivery multiplied by the price increment corresponding to said selected gear elements of said subgroup, means adding the second and third outputs to provide an indication of total price of said total delivery, valve means controlling the delivery of said liquids, controlling means for said valve means to effect delivery of said liquids in substantially a predetermined ratio, and means exhibiting a total price for the delivered liquids settable in accordance with the combined adjustment of said variator and said selection of gear elements of said subgroup.

12. Apparatus for the simultaneous vending of two liquids comprising metering means providing an output corresponding to the total delivery of said liquids, a variator receiving said output and adjustable to provide a second output corresponding to the amount of said total delivery multiplied by a unit price, a variable gear mechanism having a group of gear elements individually corresponding to price increments, means for selecting a subgroup of said group for possible operation while leaving others of said group inactive, means for selecting for operation gear elements of said subgroup, means providing to said variable gear mechanism the first mentioned output, thereby to provide from said variable gear mechanism a third output corresponding to the amount of said total delivery multiplied by the price increment corresponding to said selected gear elements of said subgroup, means adding the second and third outputs to provide an indication of total price of said total delivery, valve means controlling the delivery of said liquids, controlling means for said valve means settable in accordance with said selection of gear elements of said subgroup to effect delivery of said liquids in substantially a predetermined ratio, and means exhibiting a total price for the delivery liquids settable in accordance with the combined adjustment of said variator and said selection of gear elements of said subgroup.

13. Apparatus for the simultaneous vending of two liquids comprising metering means providing an output corresponding to the total delivery of said liquids, a variator receiving said output and adjustable to provide a second output corresponding to the amount of said total delivery multiplied by a unit price, a variable gear mechanism having a group of gear elements individually corresponding to price increments, means for selecting a subgroup of said group for possible operation while leaving others of said group inactive, means for selecting for operation gear elements of said subgroup, means providing to said variable gear mechanism the first mentioned output, thereby to provide from said variable gear mechanism a third output corresponding to the amount of said total delivery multiplied by the price increment corresponding to said selected gear elements of said subgroup, means adding the second and third outputs to provide an indication of total price of said total delivery, valve means controlling the delivery of said liquids, controlling means for said valve means to effect delivery of said liquids in substantially a predetermined ratio, a plurality of indicators exhibiting total prices for delivered liquids settable in accordance with the combined adjustment of said variator and said selection of a subgroup of said gear elements, and means for controlling exhibition by the indicator corresponding to said selection of gear elements of said subgroup.

14. Apparatus for the simultaneous vending of two liquids comprising metering means providing an output corresponding to the total delivery of said liquids, a variator receiving said output and adjustable to provide a second output corresponding to the amount of said total delivery multiplied by a unit price, a variable gear mechanism having a group of gear elements individually corresponding to price increments, means for selecting a subgroup of said group for possible operation while leaving others of said group inactive, means for selecting for operation gear elements of said subgroup, means providing to said variable gear mechanism the first mentioned output, thereby to provide from said variable gear mechanism a third output corresponding to the amount of said total delivery multiplied by the price increment corresponding to said selected gear elements of said subgroup, means adding the second and third outputs to provide an indication of total price of said total delivery, valve means controlling the delivery of said liquids, controlling means for said valve means settable in accordance with said selection of gear elements of said subgroup to effect delivery of said liquids in substantially a predetermined ratio, a plurality of indicators exhibiting total prices for delivered liquids settable in accordance with the combined adjustment of said variator and said selection of a subgroup of said gear elements, and means for controlling exhibition by the indicator corresponding to said selection of gear elements of said subgroup.

No references cited.